(12) United States Patent
Chen et al.

(10) Patent No.: US 11,375,347 B2
(45) Date of Patent: Jun. 28, 2022

(54) SYSTEM AND METHOD FOR DELIVERING SECONDARY CONTENT TO MOVIE THEATER PATRONS

(71) Applicant: Disney Enterprises, Inc., Burbank, CA (US)

(72) Inventors: Alexander Chen, La Canada, CA (US); James Voris, San Gabriel, CA (US); Mark Arana, West Hills, CA (US); Leon Silverman, Burbank, CA (US); Tuomo Korpinen, Tarzana, CA (US)

(73) Assignee: Disney Enterprises, Inc., Burbank, CA (US)

( * ) Notice: Subject to any disclaimer, the term of this patent is extended or adjusted under 35 U.S.C. 154(b) by 293 days.

(21) Appl. No.: 13/844,038

(22) Filed: Mar. 15, 2013

(65) Prior Publication Data

US 2014/0237082 A1 Aug. 21, 2014

Related U.S. Application Data

(60) Provisional application No. 61/767,204, filed on Feb. 20, 2013.

(51) Int. Cl.
*H04W 4/18* (2009.01)
*H04N 21/81* (2011.01)
(Continued)

(52) U.S. Cl.
CPC .......... *H04W 4/18* (2013.01); *H04N 21/2143* (2013.01); *H04N 21/25891* (2013.01);
(Continued)

(58) Field of Classification Search
CPC ..... H04L 67/02; H04W 4/18; H04N 21/8106; H04N 21/4126; H04N 21/4307; H04N 21/25891; H04N 21/2143
See application file for complete search history.

(56) References Cited

U.S. PATENT DOCUMENTS

| | | | | |
|---|---|---|---|---|
| 4,859,994 A | * | 8/1989 | Zola | G02B 27/026 345/9 |
| 6,263,505 B1 | * | 7/2001 | Walker | H04N 7/17318 348/E7.071 |

(Continued)

FOREIGN PATENT DOCUMENTS

| | | |
|---|---|---|
| EP | 1185142 A2 | 3/2002 |
| WO | 2012114169 A1 | 8/2012 |

OTHER PUBLICATIONS

Mass Hysteria Entertainment Company, Inc.; Mass Hysteria Entertainment Company Signs Technology Deal with Software Developers Patrick Greene and Alexander Harrington for Its Interactive Cinema Experience, Computer Weekly News, Nov. 29, 2012, pp. 1-2, 85,NewsRx, Atlanta, United States.
(Continued)

*Primary Examiner* — Jimmy H Tran
(74) *Attorney, Agent, or Firm* — Farjami & Farjami LLP

(57) ABSTRACT

Systems and methods disclosed herein include systems and methods for delivering secondary content to a plurality of user devices, the secondary content comprising events synchronized to primary content. The process can include: delivering an application to a plurality of user devices, the application configured to play or executed secondary content on the user devices; and causing the secondary content executed on the user devices to be synchronized with primary content.

20 Claims, 5 Drawing Sheets

(51) Int. Cl.
*H04N 21/41* (2011.01)
*H04N 21/258* (2011.01)
*H04N 21/214* (2011.01)
*H04N 21/43* (2011.01)

(52) U.S. Cl.
CPC ... *H04N 21/4126* (2013.01); *H04N 21/43079* (2020.08); *H04N 21/8106* (2013.01)

(56) References Cited

U.S. PATENT DOCUMENTS

| | | | |
|---|---|---|---|
| 6,504,990 B1* | 1/2003 | Abecassis | H04N 7/17318 348/E7.071 |
| 6,785,539 B2* | 8/2004 | Hale | H04W 4/029 455/422.1 |
| 7,277,870 B2 | 10/2007 | Mourad et al. | |
| 7,938,727 B1* | 5/2011 | Konkle | A63F 13/332 463/42 |
| 8,179,475 B2* | 5/2012 | Sandrew | H04N 9/8715 348/515 |
| 8,254,953 B2* | 8/2012 | Mcbride et al. | 455/456.1 |
| 8,436,918 B2* | 5/2013 | Claydon | H04N 13/167 348/239 |
| 8,814,692 B2* | 8/2014 | Konkle | 463/42 |
| 2001/0005903 A1 | 6/2001 | Goldschmidt et al. | |
| 2002/0054078 A1* | 5/2002 | Taniwaki | G06Q 10/10 715/733 |
| 2002/0097984 A1* | 7/2002 | Abecassis | H04N 21/4542 348/E7.071 |
| 2002/0101537 A1* | 8/2002 | Basson | H04N 5/445 348/465 |
| 2004/0044532 A1* | 3/2004 | Karstens | H04N 21/41415 704/271 |
| 2004/0139482 A1* | 7/2004 | Hale | H04N 21/4126 725/135 |
| 2005/0200810 A1* | 9/2005 | Morales | G03B 31/04 352/12 |
| 2005/0227614 A1* | 10/2005 | Hosking | H04N 7/165 455/3.06 |
| 2006/0095262 A1* | 5/2006 | Danieli | G10L 15/08 704/251 |
| 2006/0107195 A1* | 5/2006 | Ramaswamy | H04N 21/435 715/203 |
| 2006/0136969 A1 | 6/2006 | Patton | |
| 2006/0143655 A1 | 6/2006 | Ellis et al. | |
| 2006/0184972 A1 | 8/2006 | Rafey et al. | |
| 2006/0218226 A1* | 9/2006 | Johnson | H04L 67/24 709/202 |
| 2007/0188657 A1* | 8/2007 | Basson | H04N 21/4884 348/468 |
| 2007/0216868 A1* | 9/2007 | Cashin | G03B 21/32 352/90 |
| 2008/0155613 A1 | 6/2008 | Benya et al. | |
| 2008/0229374 A1* | 9/2008 | Mick | G06F 21/10 725/93 |
| 2009/0177736 A1* | 7/2009 | Christensen | G06Q 30/02 709/203 |
| 2009/0186700 A1* | 7/2009 | Konkle | A63F 13/332 463/42 |
| 2009/0298417 A1* | 12/2009 | Phillips | H04H 20/02 455/3.04 |
| 2010/0015994 A1* | 1/2010 | Mcbride | H04W 4/20 455/456.1 |
| 2010/0125875 A1 | 5/2010 | Hays et al. | |
| 2010/0257569 A1 | 10/2010 | O'Hanlon | |
| 2011/0020774 A1 | 1/2011 | Nguyen et al. | |
| 2011/0135282 A1* | 6/2011 | Whiteing | H04N 5/775 386/296 |
| 2011/0138433 A1* | 6/2011 | Whiteing | H04N 21/2385 725/114 |
| 2011/0161999 A1* | 6/2011 | Klappert | H04N 21/4755 725/25 |
| 2011/0184826 A1* | 7/2011 | Salamatov | G06Q 30/02 705/26.1 |
| 2011/0202156 A1* | 8/2011 | Glitsch | H04N 21/2407 700/94 |
| 2012/0064874 A1* | 3/2012 | Pierce, Jr | H04M 1/72403 455/418 |
| 2012/0095749 A1* | 4/2012 | Capretta | H04H 20/63 704/8 |
| 2012/0144416 A1* | 6/2012 | Wetzer | H04N 21/812 725/14 |
| 2012/0210349 A1* | 8/2012 | Campana | G06F 3/147 725/32 |
| 2012/0216222 A1* | 8/2012 | Candelore | H04N 21/8106 725/28 |
| 2012/0290336 A1* | 11/2012 | Rosenblatt | H04B 5/00 705/5 |
| 2012/0324505 A1 | 12/2012 | Casagrande et al. | |
| 2013/0111514 A1* | 5/2013 | Slavin | H04N 21/8126 725/18 |
| 2013/0138781 A1* | 5/2013 | Landow | G06F 3/048 709/219 |
| 2013/0177286 A1* | 7/2013 | Miazzo | H04N 9/87 386/201 |
| 2013/0205315 A1 | 8/2013 | Sinha et al. | |
| 2013/0239132 A1* | 9/2013 | Rakoff | H04N 21/8456 725/13 |
| 2013/0272672 A1* | 10/2013 | Padro Rondon | G03B 31/04 386/201 |
| 2013/0293777 A1* | 11/2013 | Huber | G03B 21/00 348/468 |
| 2013/0345841 A1* | 12/2013 | Garcia | H04N 21/8455 700/94 |
| 2014/0028914 A1* | 1/2014 | Polak | H04N 21/4394 348/515 |
| 2014/0032565 A1* | 1/2014 | Parker | G06F 16/78 707/741 |
| 2014/0040189 A1* | 2/2014 | Cuttner | G06F 16/7844 707/610 |
| 2014/0068687 A1 | 3/2014 | Greenberg et al. | |
| 2014/0089515 A1* | 3/2014 | Collart | H04N 21/835 709/229 |
| 2014/0089804 A1* | 3/2014 | Gazit | G11B 27/034 715/723 |
| 2014/0108602 A1* | 4/2014 | Barnes | H04W 4/02 709/217 |
| 2014/0123161 A1 | 5/2014 | Van Coppenolle et al. | |
| 2014/0143806 A1 | 5/2014 | Steinberg et al. | |
| 2014/0195653 A1* | 7/2014 | Alexander | H04N 21/4347 709/219 |
| 2014/0208351 A1 | 7/2014 | Moore | |
| 2014/0208355 A1* | 7/2014 | Gregov | H04N 21/44008 725/40 |
| 2014/0259082 A1 | 9/2014 | Broome et al. | |
| 2014/0282686 A1 | 9/2014 | Silverman | |
| 2014/0282713 A1 | 9/2014 | Le Pelerin et al. | |
| 2014/0310754 A1 | 10/2014 | Collart et al. | |
| 2014/0373036 A1 | 12/2014 | Phillips | |
| 2015/0003798 A1* | 1/2015 | Walker | H04N 21/42204 386/201 |
| 2015/0012933 A1 | 1/2015 | Fay et al. | |
| 2015/0074735 A1 | 3/2015 | Herigstad et al. | |
| 2015/0089530 A1 | 3/2015 | Abele | |
| 2015/0095948 A1 | 4/2015 | Kummer et al. | |
| 2015/0143413 A1 | 5/2015 | Hall et al. | |
| 2015/0143419 A1 | 5/2015 | Bhagwat et al. | |
| 2015/0163529 A1 | 6/2015 | Faarkash et al. | |
| 2015/0170325 A1* | 6/2015 | Abecassis | G11B 27/28 345/2.1 |
| 2015/0256903 A1 | 9/2015 | Walker | |
| 2016/0073141 A1* | 3/2016 | Brand | H04N 21/23424 725/32 |
| 2016/0182971 A1* | 6/2016 | Ortiz | H04N 21/42224 725/34 |
| 2016/0323656 A1* | 11/2016 | Holland | H04N 21/4725 |

(56) References Cited

U.S. PATENT DOCUMENTS

2018/0295413 A1\* 10/2018 Harkness ........... H04N 21/4398
2019/0090028 A1\* 3/2019 Kirley ................ H04N 21/4302

OTHER PUBLICATIONS

How MovieReading Works, How It Works, http://www.moviereading.com/en/support/, Dec. 9, 2013.
Ebert et al., U.S. Appl. No. 61/314,315, "Movie and Store Mode Mobile Device System and Method", filed Mar. 16, 2010, pp. 1-17.

\* cited by examiner

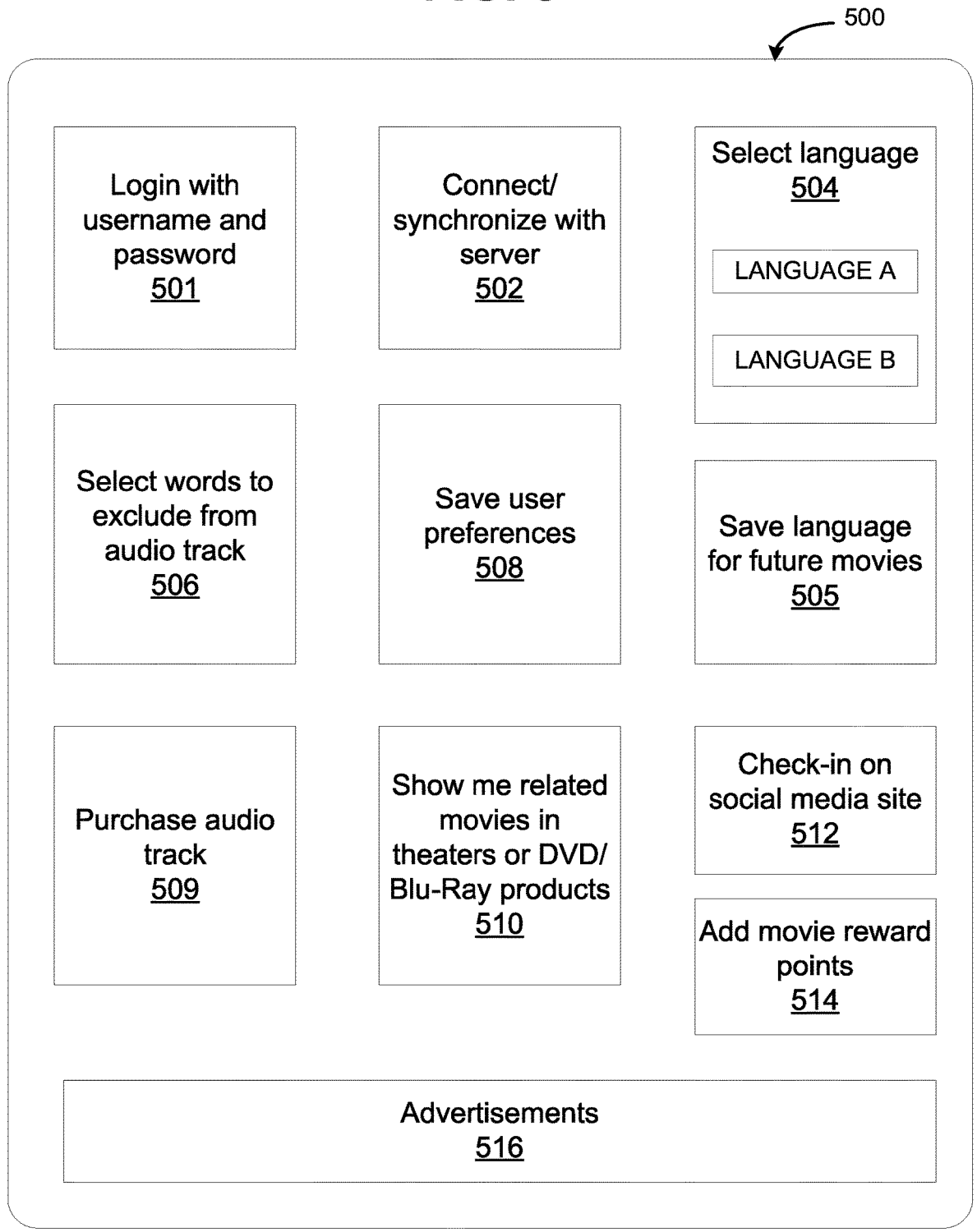

SYSTEM AND METHOD FOR DELIVERING SECONDARY CONTENT TO MOVIE THEATER PATRONS

CROSS-REFERENCE TO RELATED APPLICATIONS

This application claims the benefit of U.S. Provisional Application No. 61/767,204, filed Feb. 20, 2013.

TECHNICAL FIELD

The present disclosure relates generally to audio and video content, and, more particularly, to systems and methods for delivering secondary content to movie theater patrons.

DESCRIPTION OF THE RELATED ART

The conventional movie-going experience has evolved over time, but that evolution has been slow. While there have been vast improvements in animation, 3D and special effects, changes to the in-theater experience have not been as dramatic. Recent improvements to the in-theater experience have included things like the proliferation of larger screens, the addition of D-Box® seating, and the appearance of high-end luxury cinemas.

BRIEF SUMMARY OF THE DISCLOSURE

According to various embodiments, systems and methods described herein provide a plurality of users with secondary or supplemental content (such as an alternate audio track in a user-selected language and/or without certain words designated by the user) to accompany primary program content. For example, in some embodiments, systems and methods are provided to download an application program onto client devices, including portable client devices such as, for example, an iPad®, tablet computer, iPhone®, Kindle®, Android® device, or other tablet, mobile phone or computing device. The application provides secondary content that at least in part corresponds to, or is designed to accompany, the primary content. Various embodiments provide a method to initiate the application and synchronize the application with the primary program content. Accordingly, the application can provide secondary program content, synchronized or otherwise, to accompany the primary program content.

For example, in one embodiment, the systems and methods described herein can be provided and applied to enhance the movie-going experience. As a further example, in one embodiment, a process is provided for delivering secondary content to a user device, where the secondary content is synchronized to a motion picture being shown in a movie theater. The secondary content may, in some embodiments, interact with, accompany or otherwise correspond to the motion picture. In various embodiments, the process includes installing a user-interface application on a user device; connecting to an application server through the application on the user device; downloading secondary content to the user device; loading the secondary content; and executing the secondary content. In one embodiment, the secondary content is synchronized and played simultaneously with a primary content. In this embodiment, the process also includes synchronizing the secondary content with the primary content. The process may also include identifying a user using user-specific credentials. In this embodiment, it is then possible to display secondary content to a user that is based in part on user-specific information associated with the identified user.

In another embodiment, a non-transitory computer readable medium is provided that comprises an instruction set configured to cause a computing device to perform the steps of the process described above.

In another embodiment, a system for delivering secondary content to a user device in a motion picture theater is provided. The system can include a primary content display device; a primary content delivery device configured to cause a motion picture to be shown on the primary content display device; and an application server configured to provide secondary content to the user device. The user device may be configured to run an application, the application being configured to execute secondary content.

In various embodiments, the secondary content may be synchronized with the primary content, and the application on the user device is configured to synchronize the secondary content with the primary content. The synchronizing can include receiving a synchronization signal on the user device, and the synchronization signal may include an audio signal. The application may be further configured to receive user-identifying credentials that are associated with a specific user, and present secondary content options that are based in part on user-specific information. The secondary content may comprise a alternate language audio track or alternate language subtitles, and the user-specific information might include a language preference set by the user.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

FIG. 5 illustrates an example user interface that may be displayed on the user device of FIG. 2, as described with FIG. 3.

DETAILED DESCRIPTION

Some people like to watch movies with an audio track in their native language, which may not be English. Some people like to watch movies without hearing swear words, derogatory words, or other offensive language. The systems and methods described herein provide one or more users with secondary content to accompany primary program content. For example, the secondary content may be an alternate audio track in a user-selected language and/or without certain words designated by a user (i.e., pre-blocked by the user), such as swear words or words that refer to race, ethnicity, color, religion, sex, sexual orientation, cultural status, etc.

Figure 1:
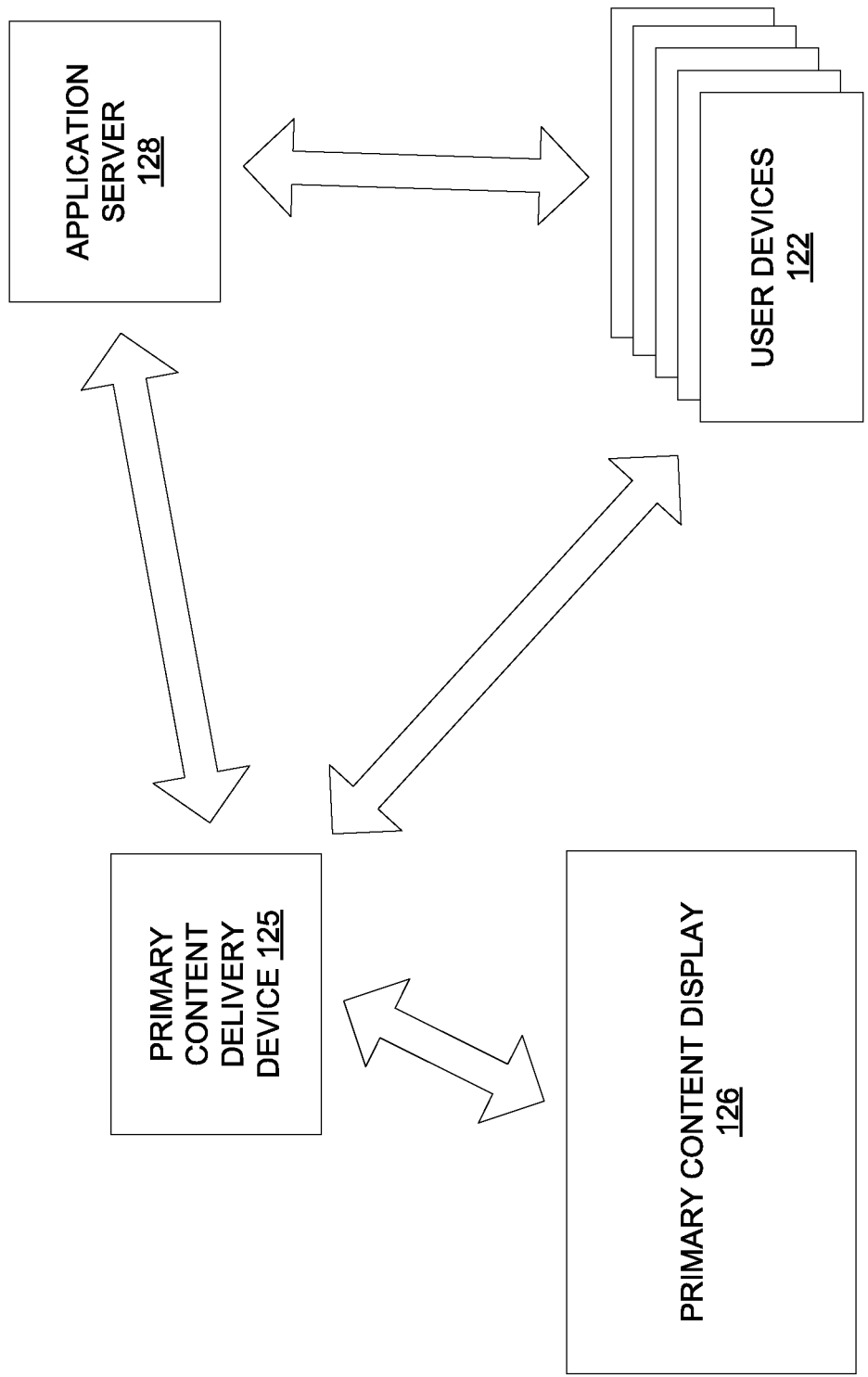
FIG. 1 illustrates a system for providing secondary content in accordance with one embodiment of the systems and methods described herein.

FIG. 1 illustrates a system for providing secondary program content in accordance with one embodiment of the systems and methods described herein. The system in FIG. 1 includes an application server 128, a primary content delivery device 125, a primary content display device 126, and a plurality of user devices 122. As depicted by the arrows in the illustrations, application server 128, primary content delivery device 125, primary content display device 126, and user devices 122 may be in communicative contact with one or more other components in this example.

Primary content delivery device 125 can be configured to provide or play audio/video content to one or more users or viewers. Primary content display device 126 displays the video content to the users. In some embodiments, primary content display device 126 is integrated with primary content delivery device 125, while in other embodiments, they are separate devices. For example, in terms of the in-theater environment, primary content delivery device 125 can include a motion picture projection system. Such a motion picture projection system can be configured to project a motion picture onto a movie screen and to provide the soundtrack or other audio content accompanying the movie. Accordingly, primary content display device 126 can include a movie screen onto which the motion picture is projected by primary content delivery device 125.

Figure 3:
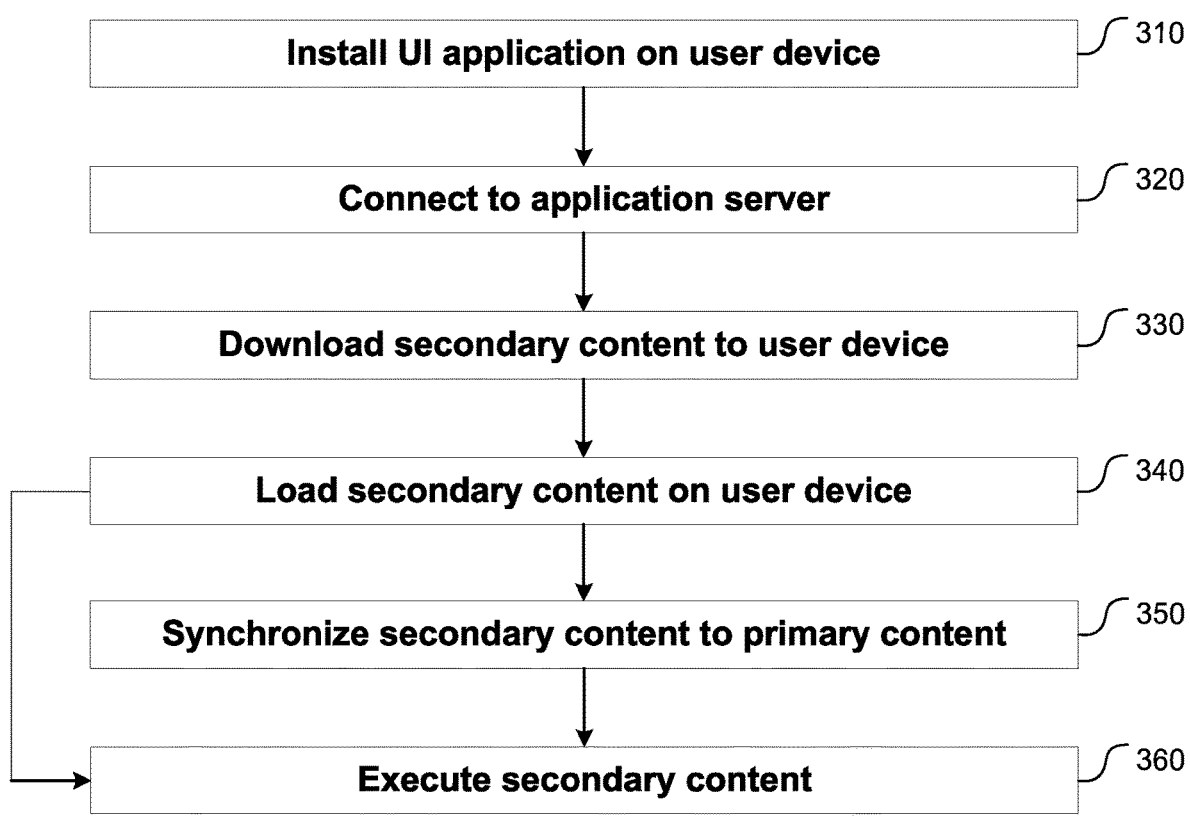
FIG. 3 illustrates an example process for providing secondary content to one or more user devices in FIG. 1 in accordance with one embodiment of the systems and methods described herein.

User devices 122 can be fixed (e.g., fixed to seats in the theater) or portable devices. User devices 122 can include, for example, a plurality of client or user devices such as iPads®, tablet computers, iPhones®, Kindles®, Android® devices, or other tablets, mobile phones or computing devices. User devices 122 can be selected with a sufficiently large display area to allow suitable viewing of secondary content or to allow sufficient touch-screen area for viewing and selection of secondary content options (FIG. 5 described further below). In some embodiments, an application program is downloaded onto the user device 122 (FIG. 3 described further below). The application provides secondary content that at least in part corresponds to, or is designed to accompany, the primary content. Various embodiments provide a method to initiate the application and synchronize the application with the primary program content. Accordingly, the application can provide secondary program content, synchronized or otherwise, to accompany the primary program content. In one configuration, the user devices 122 may not contain a display and may be configured to provide only non-visual secondary content. For example, if only audio secondary content is provided, then the audio secondary content can be played on an MP3 player or other audio player without a display. As such, it should be understood that although this disclosure generally deals with user devices with displays, displays are not a requirement to fall within the meaning of a user device as contemplated by this disclosure.

Application server 128 can include a computing system with wired or wireless communication interfaces to communicate with one or more of primary content delivery device 125, primary content display device 126, and user devices 122. Application server 128 can be implemented, for example, as a computing system using the Windows®, Apple®, Unix®, Linux®, MacOS, or other operating system. In various embodiments, communications with user devices 122 are all wireless communications so that the users can enjoy an untethered experience. In one example, application server 128 can be a server local to the theater and communicating with the user devices 122 via a wireless access point in the theater vicinity. In another example, application server 128 can be a server that is not local to the theater and that communicates with the user devices 122 via cellular networks, via an IP network and a wireless access point, or via another communication interface. In yet another example, application server 128 can be implemented using a combination of both local and remote components.

Communication links are illustrated in the example system of FIG. 1. Such links are provided between primary content delivery device 125, application server 128 and user devices 122. Other communication configurations are possible without departing from the scope of the application. For example, in some embodiments, the program content running on primary content delivery device 125 can be pre-configured and does not require real-time interaction via a network or other communication link. That is, the program content can be played without change or interruption to the program. Accordingly, in such embodiments, a communication interface is not required between primary content delivery device 125 and application server 128 or user devices 122. Instead, the primary and secondary program content can be synchronized and set to run.

In one embodiment, the systems and methods described herein can be provided and applied to enhance and individualize the movie-going experience. For example, primary program content can be provided by the primary content delivery device 125 in the form of a motion picture such as a full-length feature movie. Other types of video or audio/video content can serve as the primary content. In this example environment, the primary program content is presented to the audience members (sometimes referred to in this example as viewers or users) on the primary content display 126, such as the conventional movie screen at the front of the theater. The application loaded onto the user devices 122 can be configured to provide secondary content to the audience members; the secondary content accompanying, and in some cases corresponding to, the motion picture being displayed on the primary content display 126.

Continuing with this example, the client application executing on the user devices 122 is synchronized to the motion picture on the primary content display 126 such that secondary content can be synchronized with, and in some embodiments triggered by, events in the motion picture. For example, the movie can have visual and/or audio cues (to be detected by image recognition and/or audio recognition software at the user device 122) or be tagged with semaphores, flags or other data to trigger certain aspects or subroutines of the application. If an audio signal is used, the audio signal may be audible (e.g., opening theme song) or not audible to humans (e.g., very low frequency or very high frequency). Such data might include time codes that are embedded in the primary video content and in the secondary content and can be used to synchronize the secondary content to the primary content. The secondary content's time code data can periodically or constantly be matched to time data in the primary video content to ensure that they are in sync with each other. Pre-defined location markers, such as chapter markers, may also be used to synchronize the content. This can be correlated, in various embodiments, through the application server 128 that receives the tags from the movie content of the primary content delivery device 125 and signals the user devices 122 to execute the corresponding subroutine in the client application. Alternatively, a synchronization signal may be manually entered to the user device 122 by the user to synchronize the secondary content to the primary content.

In further embodiments, other synchronization techniques can be used such as, for example, audio synchronization, synchronized start with elapsed time measurement, or other synchronization techniques. In one example, a movie theater can use multiple synchronization techniques to ensure more accurate synchronization. Accordingly, the system can be configured such that a particular event in the movie can trigger a corresponding activity or event on the user devices. Alternatively, the system can be configured such that the application server 128 or other computing device controls the primary content and the client applications to maintain synchronization.

Still continuing with the example environment of a movie theater, in some embodiments, the corresponding events or activities can include events such as alternative language tracks; trivia or quiz contests based on events in the movie, possibly in multiple languages; polls requesting that the audience members vote for favorite characters, possibly in multiple languages; optional endings or other scenes; and other events and activities to involve the movie-going audience in the movie.

In further embodiments, the events can involve providing content to use the screen of the user device 122 as a duplication or an extension of the primary content display 126. For example, duplicate audio and video content can be provided on the user devices 122 to allow the user devices 122 to serve as secondary viewing platforms for the primary content. A more specific example might entail providing alternative language subtitles on the user device 122 for viewers who speak other languages.

Figure 2:
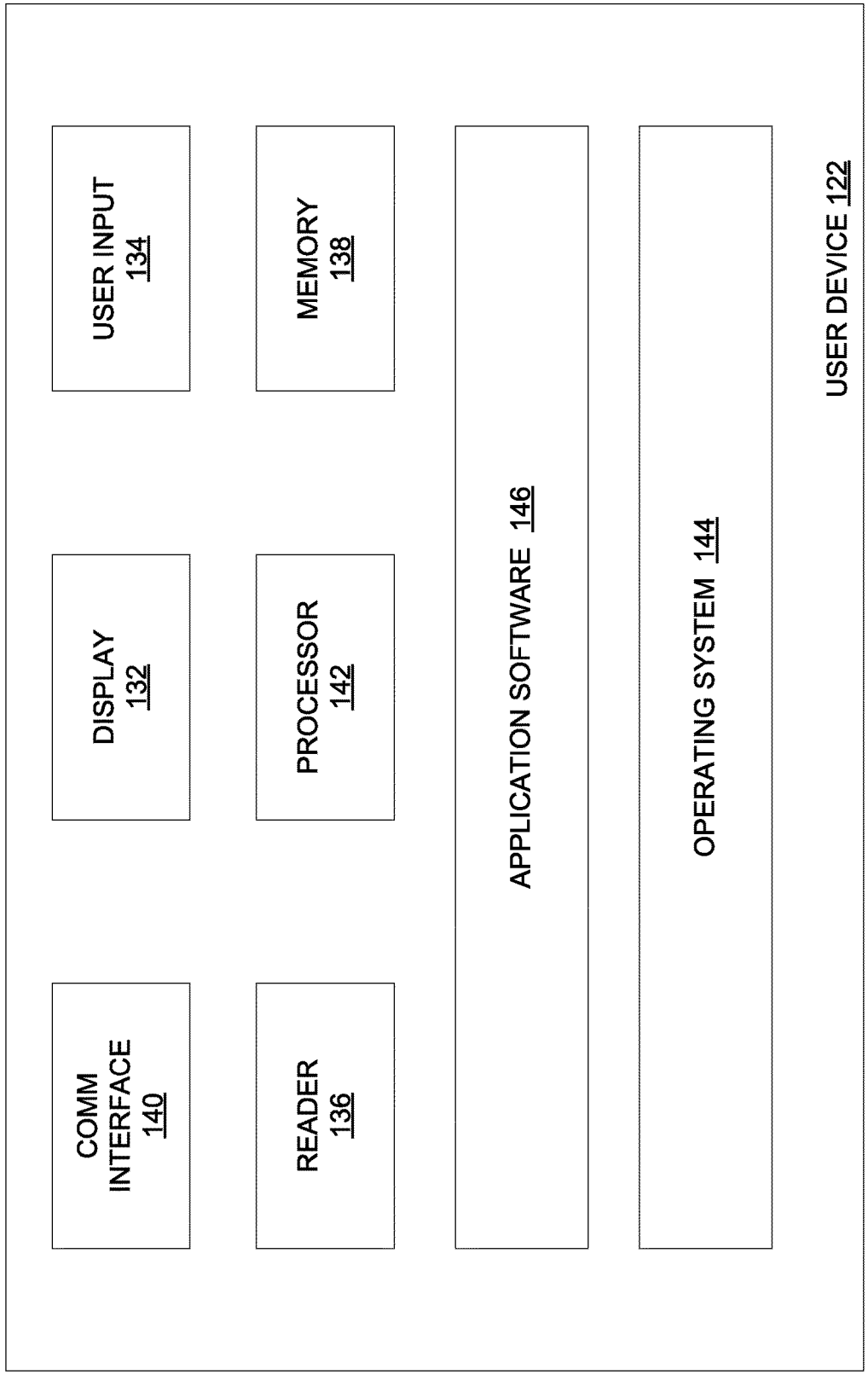
FIG. 2 illustrates a detailed view of one example of a user device in FIG. 1 in accordance with one embodiment of the systems and methods described herein.

FIG. 2 illustrates one example of a user device 122 of FIG. 1. The user device 122 may include operating system software 144, which may be a conventional operating system such as Windows, MacOS, Linux, or others; it may be a stripped down version of an operating environment such as a Java Virtual Machine or the like; or it may be a mobile operating system such as the Android Operating System from Google, the iOS from Apple, the Windows Phone from Microsoft or other mobile operating system. The operating system software 144 may include software routines that allow for the hosting and execution of one or more application programs or application software 146.

The application software 146 may include software that provides additional functionality to the user device 122. In some embodiments, the application software 146 may include applications to provide and execute secondary content such as those described herein. As described herein, application software 146 may be downloaded to the device 122 such as via communication interface 140 (described below) or it may be preinstalled in memory of user device 122.

As shown, the example user device 122 includes a display 132. The display 132 may form part of the user device 122, or it may be a separate hardware component that is connected to the user device 122. For example, the display 132 may be a touch screen display, which is part of the iPad device.

The example user device 122 also includes a processor 142 and memory 138. The memory 138 may include volatile memory such as some form of random access memory, and it may include non-volatile memory such as flash memory or a hard disk drive. The processor 142 may be a conventional central processing unit (CPU) such as those manufactured by AMD, and Intel, or it may be a specialized processor. The processor 142 may be configured to execute computer instructions from the operating system software 144, application software 146, or other software stored in the memory 204.

The user device 122 may also include a communication interface 140. The communication interface 140 may take the form of a network interface chip or card and its corresponding driver software that allows the user device 122 to communicate with external networks. For example, communication interface 140 can include communication interfaces to support communication protocols such as 2G, 3G, or 4G cellular, Bluetooth®, WiFi®, near field communication (NFC), or other wireless or wired protocols. The user device 122 may further include a card reader or other memory device reader 136 capable of reading removable memory cards such as, for example, SD cards, thumb drives and the like.

In one embodiment, the user devices 122 may have certain functions locked or disabled during the movie after synching with the primary content delivery device 125 or application server 128, or otherwise being informed of a movie being played. Examples of functions that can be locked are the camera (to prevent users from capturing images or recording video of the movie) and the cellular transceiver (to prevent users from making or receiving calls or texts during the movie). The speaker on the user device 122 may also be locked to prevent disruptive noises from the user devices 122. In some cases, a user can listen to audio from the user device 122 through headphones, wherein the user device 122 mutes itself when headphones are not plugged into the user device 122.

FIG. 3 illustrates an example process for providing secondary content to one or more user devices 122 in FIGS. 1 and 2 in accordance with one embodiment of the systems and methods described herein. In FIG. 3, at operation 310, a user-interface application is installed on the user device 122. This user-interface application, in some embodiments, is the application software 146 of FIG. 2. In one embodiment, the user-interface application is an application on a mobile device or a similar application on a computing device. This application is used to interact with the application server 128 to receive and execute secondary content on the user device 122. At the time for the showing, the viewer attends the program. For example, in terms of the in-theater experience, the viewer attends the designated movie in the designated theater. In one embodiment, the viewer brings his or her iPad or other user device 122 to the theater. In other embodiments, the user devices 122 are provided at the theater to the viewers.

FIG. 5 illustrates an example user interface 500 that may be displayed on the user device of FIG. 2, as described here with FIG. 3.

At operation 320, when in the theater, the user device 122 connects to the application server 128 (e.g., by pressing a tab or icon 502 in FIG. 5). This connection can be established using a wireless connection, such as, for example, an IEEE 802.11 Wi-Fi network connection, a cellular (e.g., 3G or 4G) connection, a BlueTooth connection, near field communication, or other communication connection. In other embodiments, the system can be configured to connect to the user device 122 before the user enters the theater or screening room. For example, the system can be configured to connect to the user device 122 while the user is in line for tickets or admission, or in the lobby or the snack shop. In another embodiment, the system may allow for connection to the application server 128 anywhere that the user has an internet or wide area connection, thereby allowing the user to view, select, purchase and download secondary content before they head to the movie theater (blocks 504-509 in FIG. 5).

In one embodiment, the user connects to the application server 128 by opening the user-interface application on the user device 122, and then logging in using a password or other key (block 501 in FIG. 5). In this embodiment, a user may be required to register for a unique username and password that is associated with that user. Or the user may have a movie reward account with the theater or movie studio.

Registration and association of a username and password with a particular user may allow for greater personalization of the user's movie experience. For example, when a user logs in using their username and password, the user-interface application might manually (block 512 in FIG. 5) or automatically "check-in" the user as an attendee of the movie in a social media web or mobile site. This might increase a user's social media presence, while simultaneously providing publicity for the movie.

Additionally, the user may be able to store or save preferences that are associated with their account, such as a language preference (blocks 505 and 508 in FIG. 5). When a language preference is set, the application might automatically offer an alternative language track in the user's preferred language any time a user logs in at a movie (block 505 in FIG. 5). Additionally, product advertisements that are specifically tuned to the user's preferences may be offered to the user (block 510 in FIG. 5). For example, if the user sets a preferred language, product advertisements might appear on the user's application in the user's preferred language, or home products of the movie the user is attending or other movie products may be offered to the user in their preferred language, or movie trailers may be played in the user's preferred language. Advertisements (block 516 in FIG. 5) may also be tuned to the specific user by offering the user products that are similar to past products that the user has purchased. Users may also be offered rewards on their personal accounts for attending movies (block 514 in FIG. 5) and logging in or checking into social media at a movie or purchasing products through the user-interface application (block 510 in FIG. 5). These rewards could be redeemed for prizes or benefits, which would incentivize users to attend more movies, log in, and use the user-interface application.

User registration and log-in also provide a security feature by allowing certain purchased or earned products to be used only by that particular user. For example, if a user purchases secondary content, such as an alternative audio track for a movie, then that secondary content will be associated with that particular user and can only be accessed by logging into that user's account. In one embodiment, this may be carried out by "watermarking" the audio track with user-identifying information so that the track is tied to that particular user.

At operation 330, the secondary content associated with the movie or other primary program content is downloaded or streamed from application server 128 to the user device 122. The secondary content can be downloaded in advance of the viewer going to the theater or, alternatively, it may be downloaded onto the user device 122 when the user enters the theater. The secondary content may also be downloaded piecemeal such that it is "streamed" (with or without storing a digital copy) to the user device 122 as the primary content is playing.

Examples of secondary content that can be downloaded might include alternative language tracks, alternative language subtitles, audio tracks with user-designated words removed, movie trivia and facts in a variety of languages, questionnaires and games in a variety of languages, video overlays, or product advertisements.

In some embodiments, the secondary content downloads automatically upon connection to application server 128. For example, product advertisements could download and display automatically on the user device 122, thereby offering the user products that are related to the movie or other movies by the same production company. In other embodiments, the viewer initiates the download using one or more tabs, icons or buttons shown in FIG. 5. For example, upon connection to the application server 128, a username and password or other key may be required to allow the user to access the network (block 501 in FIG. 5). Then the user can select the appropriate secondary content, and download the selected content. The viewer may be asked to select the appropriate title or application for the movie that he or she is viewing. This can be useful, for example, in a multi-theater venue where multiple networks or multiple titles are playing simultaneously. Alternatively, the user device 122 may interact with the application server 128 and/or the primary content delivery device 125 to automatically determine relevant secondary content, and then suggest this content to the user for the user to select the content they wish to download or stream.

Once secondary content has been downloaded to the user device 122, the user device 122 loads the secondary content at operation 340. Loading of the secondary content allows for the user device 122 to determine whether the secondary content can be executed immediately, or should be executed later. For example, advertisements or pre-movie trivia facts or questions might be displayed immediately. In these embodiments, the method skips directly to operation 360 and executes the secondary content. Alternatively, other types of secondary content, such as alternate language audio tracks, alternate language subtitles, or scene-specific trivia or advertisements, or any other time-sensitive secondary content may need to be synchronized to the primary program content before being executed. In these embodiments, the method moves to operation 350.

At operation 350, the secondary content loaded on the user devices 122 is synchronized to the primary program content. In one embodiment, a synchronization signal or signals can be provided by the application server 128 to the user devices 122 and primary content delivery device 125 to synchronize them. In other embodiments, any one of these devices can be configured to synchronize with the others using communications over the network. Examples might include synchronization through WiFi, BlueTooth, near field communications, or any other wired or wireless communications mean by which synchronization signals may be transmitted. In still other embodiments, audio synchronization or visual synchronization can be used. For example, in one embodiment, SmartSync Media Synchronization software, available from Audible Magic Corporation in Los Gatos, Calif., may be used to synchronize the secondary content on the user devices 122 to the primary program content being displayed by primary content delivery device 125.

At operation 360, the secondary content is executed. As stated previously, execution of secondary content may be independent of the primary content, or it may be synchronized with the primary content. Because in some embodiments the devices are synchronized, the secondary content can be timed or triggered to occur in conjunction with related or relevant happenings in the primary content. For example, the receipt of a particular trigger signal by user devices 122 can be used to initiate predetermined secondary content associated with that trigger. In some embodiments the trigger signals can be unique signals, each associated with a particular event. In other embodiments, the trigger signals can be the same or similar, and the events programmed to initiate in sequence upon the receipt of each trigger signal.

In other embodiments, the event initiated on the user devices 122 may be content that is not necessarily triggered by a particular event in the movie. For example, the event can be a user-initiated event that is made available by the application, but that does not necessarily correspond to a particular scene or event in the movie. Such events may be themed like the movie, but may be initiated automatically or initiated on viewer demand.

As described above, the event initiated on user devices 122 can be based on an application that was downloaded to the user devices 122 when the user logged onto the network in the theater, or in advance of the showing. In other embodiments, the event can be content that is streamed to the user devices 122 in real time over the in-theater network, via the Internet, or from some other external source.

The systems and methods described above allow for greater individualization and enhancement of the movie-going experience. By providing secondary content that is tailored to individual users, the described systems and methods provide greater incentive for previously unreached consumers to attend movies. For example, alternate language audio tracks or subtitles allow viewers who speak only a non-English language to attend and enjoy movies that they could not have previously understood. Additionally, the educational benefits of watching a movie in a non-English language with English subtitles may encourage educators to take non-English language students to movies to learn a non-English language.

The system described above can be applied to a home, such as a user watching a movie on a Blu-Ray or DVD player or a video download or stream and getting a different language audio track on a second device.

The disclosed systems and methods also allow for a potential increase in movie-related product sales by offering these products before, during, and/or immediately after the movie. Related products and services may include home release media such as DVD or Blu-Ray discs, CDs, merchandise (posters) and toys, associated theme park or event tickets, restaurant dining and more. Presentation of advertisements at the time of the movie allows for the producers of the related products and services to capitalize on the positive memories and emotions that occur during or immediately after a movie. These related products and services are conventionally not available until well after the movie is released. This delay leads to the positive memories of the movie waning from the viewer's mind. By presenting these products at the same time as the movie, users will be presented with the opportunity to purchase these products at the height of their positive feelings towards the movie. Advertisements may also be more effective because they may be tailored to the specific user account. For example, if the user has selected a preferred language, advertisements may be presented in the preferred language, and DVDs and Blu-Rays in the preferred language may be offered.

In one configuration, the user device 122 and/or a headset can use noise or audio signal cancellation software and hardware to cancel or filter out the main language used in the movie. Since every spoken word in the movie is known by the application server 128, the application server 128 can provide software for an application running on the user device 122 and/or a headset to cancel or filter out every word spoken in the main language of the movie. For example, if the movie in shown in English, the user device 122 can apply noise or audio signal cancellation software to cancel or filter out the English spoken words, such that the user only hears his/her selected language audio track (e.g., Spanish or Chinese) and the background sound effects in the movie.

In one configuration, the user device 122 may include or be combined with glasses that show subtitles in the user-selected language.

Figure 4:
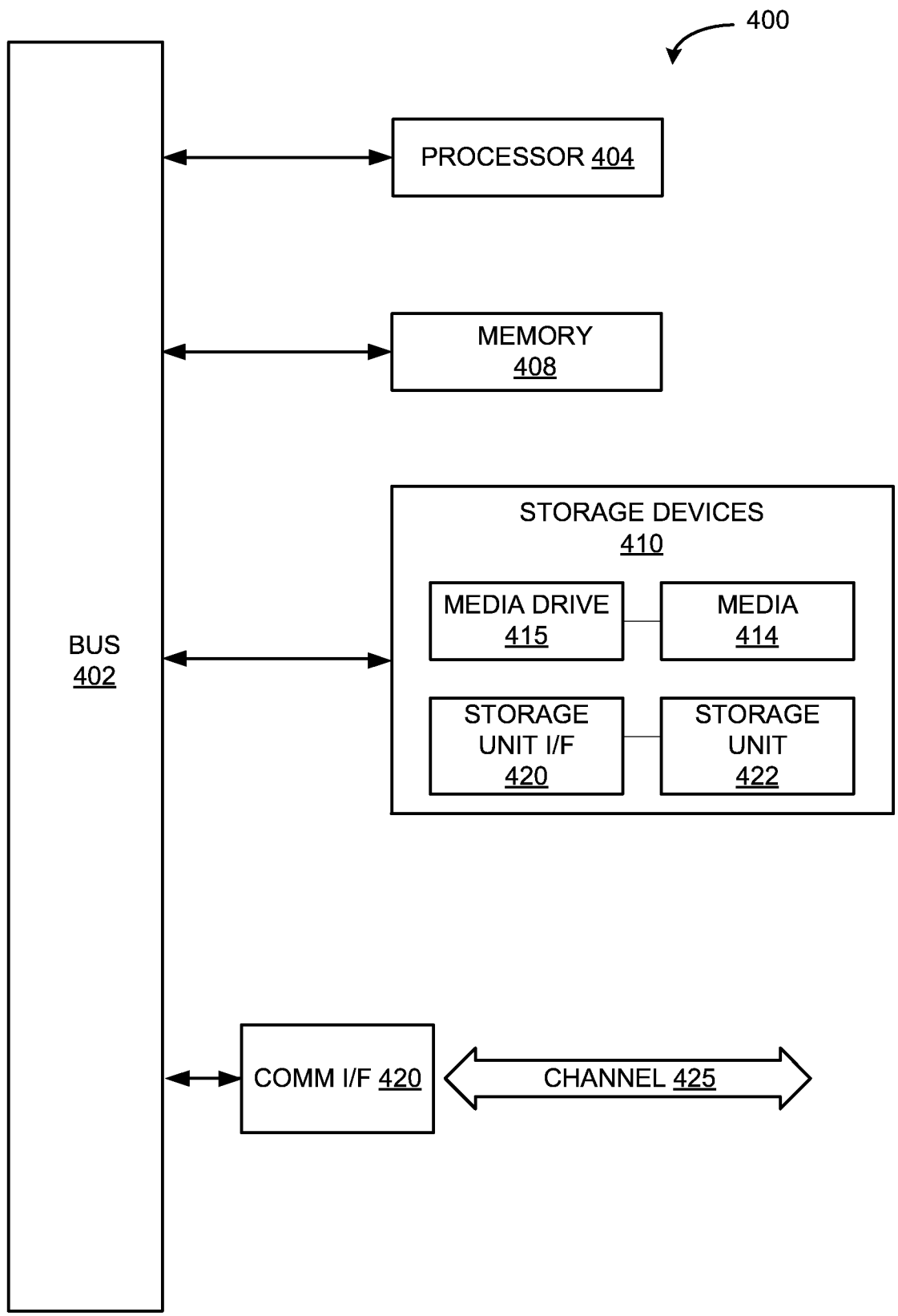
FIG. 4 illustrates an example computing module that may be used in implementing various features of embodiments of the systems and methods described herein.

A movie theater can show a movie in English, but any number of other languages can be played by user devices 122 to watch the same movie. There may be very little or no extra cost to theaters.

Where components or modules of the disclosed systems are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the disclosure using other computing modules or architectures.

Referring now to FIG. 4, computing module 400 may represent, for example, computing or processing capabilities found within desktop, laptop and notebook computers; hand-held computing devices (PDA's, smart phones, tablets, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, random access memory (RAM) or other dynamic memory might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, main memory 408, storage unit interface 420, storage media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present disclosure as discussed herein.

While various embodiments of the present disclosed systems and methods have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed systems or methods, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure has been presented with reference only to the presently preferred embodiments, those of ordinary skill in the art will appreciate that various modifications can be made without departing from this disclosure. Accordingly, this disclosure is defined only by the following claims.

The invention claimed is:

1. A method comprising:
   transmitting, by a user device to a server, a primary content information and a selection of at least one of an alternative audio or subtitles corresponding to the alternative audio, the primary content information identifying a primary content, the alternative audio being an alternate for a primary audio configured to be played along with the primary content in a venue, the alternative audio being the same as the primary audio except that the alternative audio does not include one or more categories of words designated by a user of the user device to be blocked from the primary audio;
   receiving, by the user device from the server, the at least one of the alternative audio or the subtitles, in response to transmitting the primary content information and the selection of the alternative audio;
   synchronizing, by the user device having a device display, the at least one of the alternative audio or the subtitles received from the server with the primary content being played in the venue; and
   playing, by the user device on the device display, the at least one of the alternative audio or the subtitles in synchronization with the primary content being played by a primary content delivery device on a primary content display in the venue, the primary content display being separate from the user device.

2. The method of claim 1, wherein the user device includes a plurality of features, and wherein while playing the at least one of the alternative audio or the subtitles in synchronization with the primary content being played by the primary content delivery device on the primary content display in the venue, one or more of the plurality of features of the user device are disabled.

3. The method of claim 2, wherein the one or more of the plurality of features of the user device include a camera, and wherein the camera is disabled while playing the at least one of the alternative audio or the subtitles in synchronization with the primary content being played by the primary content delivery device on the primary content display in the venue.

4. The method of claim 2, wherein the one or more of the plurality of features of the user device include a call receiver or a text receiver, and wherein the call receiver or the text receiver is disabled while playing the at least one of the alternative audio or the subtitles in synchronization with the primary content being played by the primary content delivery device on the primary content display in the venue.

5. The method of claim 2, wherein the one or more of the plurality of features of the user device include a speaker, and wherein the speaker is disabled while playing the at least one of the alternative audio or the subtitles in synchronization with the primary content being played by the primary content delivery device on the primary content display in the venue.

6. The method of claim 1, wherein the user device plays the alternative audio in synchronization with the primary content while the primary audio is being played in the venue, and wherein the method further comprises:
   performing, by the user device, noise cancellation to filter out the primary audio being played in the venue based on knowledge of the primary audio prior to being played in the venue.

7. The method of claim 1, wherein the one or more categories of words include swear words or words that refer to race, ethnicity, color, religion, sex, cultural status or sexual orientation.

8. The method of claim 1, wherein synchronizing is based on detecting at least one of an audio cue in the primary audio being played in the venue or a visual cue in the primary content being played in the venue.

9. A user device comprising:
   a device display;
   a processor; and
   an application software;
   the processor configured to execute the software application to:
      transmit, to a server, a primary content information and a selection of at least one of an alternative audio or subtitles corresponding to the alternative audio, the primary content information identifying a primary content, the alternative audio being an alternate for a primary audio configured to be played along with the primary content in a venue, the alternative audio being the same as the primary audio except that the alternative audio does not include one or more categories of words designated by a user of the user device to be blocked from the primary audio;
      receive, from the server, the at least one of the alternative audio or the subtitles, in response to transmitting the primary content information and the selection of the alternative audio;
      synchronize the at least one of the alternative audio or the subtitles received from the server with the primary content being played in the venue; and
      play, on the device display, the at least one of the alternative audio or the subtitles in synchronization with the primary content being played by a primary content delivery device on a primary content display in the venue, the primary content display being separate from the user device.

10. The user device of claim 9, wherein the user device includes a plurality of features, and wherein while playing the at least one of the alternative audio or the subtitles in synchronization with the primary content being played by the primary content delivery device on the primary content display in the venue, one or more of the plurality of features of the user device are disabled.

11. The user device of claim 10, wherein the one or more of the plurality of features of the user device include a camera, and wherein the camera is disabled while playing the at least one of the alternative audio or the subtitles in synchronization with the primary content being played by the primary content delivery device on the primary content display in the venue.

12. The user device of claim 10, wherein the one or more of the plurality of features of the user device include a call receiver or a text receiver, and wherein the call receiver or the text receiver is disabled while playing the at least one of the alternative audio or the subtitles in synchronization with the primary content being played by the primary content delivery device on the primary content display in the venue.

13. The user device of claim 10, wherein the one or more of the plurality of features of the user device include a speaker, and wherein the speaker is disabled while playing the at least one of the alternative audio or the subtitles in synchronization with the primary content being played by the primary content delivery device on the primary content display in the venue.

14. The user device of claim 9, wherein the processor is configured to execute the software application to play the alternative audio in synchronization with the primary content while the primary audio is being played in the venue, and wherein the processor is further configured to execute the software application to:
perform noise cancellation to filter out the primary audio being played in the venue based on knowledge of the primary audio prior to being played in the venue.

15. The user device of claim 9, wherein the one or more categories of words include swear words or words that refer to race, ethnicity, color, religion, sex, cultural status or sexual orientation.

16. The user device of claim 9, wherein synchronizing is based on detecting at least one of an audio cue in the primary audio being played in the venue or a visual cue in the primary content being played in the venue.

17. A method comprising:
transmitting, by a user device to a server, a primary content information and a selection of an alternative audio, the primary content information identifying a primary content, the alternative audio being an alternate for a primary audio configured to be played along with the primary content in a venue, the alternative audio being the same as the primary audio except that the alternative audio does not include one or more categories of words designated by a user of the user device to be blocked from the primary audio;
receiving, by the user device from the server, the alternative audio, in response to transmitting the primary content information and the selection of the alternative audio;
synchronizing, by the user device having a device display, the alternative audio received from the server with the primary content being played by a primary content delivery device on a primary content display in the venue, the primary content display being separate from the user device; and
playing, by the user device on the device display, the alternative audio in synchronization with the primary content being played by the primary content delivery device on the primary content display in the venue.

18. The method of claim 17, wherein the user device includes a plurality of features, wherein while playing the alternative audio in synchronization with the primary content being played by the primary content delivery device on the primary content display in the venue, one or more of the plurality of features of the user device are disabled, and wherein the one or more of the plurality of features of the user device include a camera, a call receiver, a text receiver, or a combination thereof, and wherein the camera, the call receiver, the text receiver, or the combination thereof is disabled while playing the alternative audio with the primary content.

19. The method of claim 17, wherein the user device plays the alternative audio in synchronization with the primary content while the primary audio is being played in the venue, and wherein the method further comprises:
performing, by the user device, noise cancellation to filter out the primary audio being played in the venue based on knowledge of the primary audio prior to being played in the venue.

20. The method of claim 17, wherein the one or more categories of words include swear words or words that refer to race, ethnicity, color, religion, sex, cultural status or sexual orientation.

* * * * *